W. D. TURNER.
EGG BEATER.
APPLICATION FILED AUG. 21, 1914.
1,223,839.
Patented Apr. 24, 1917.
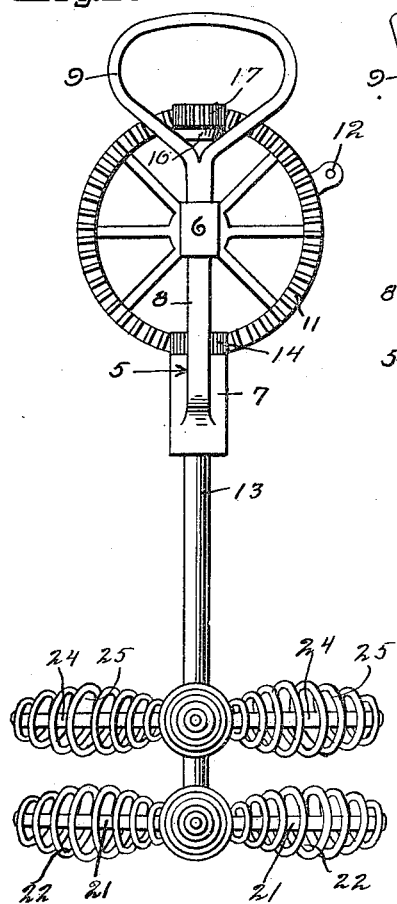
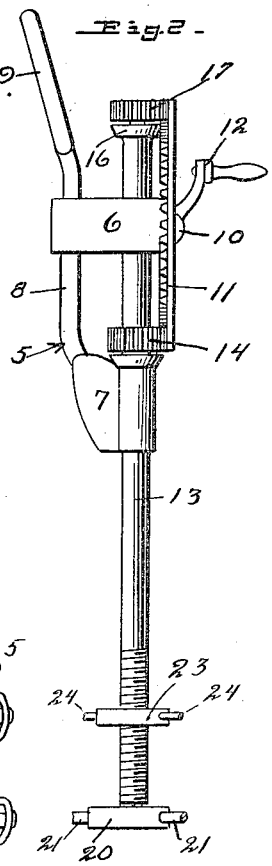
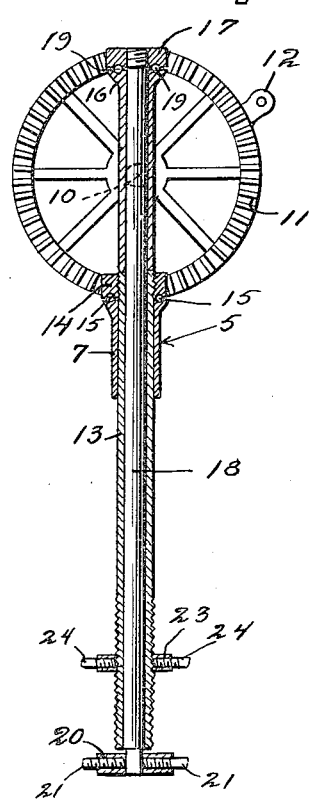
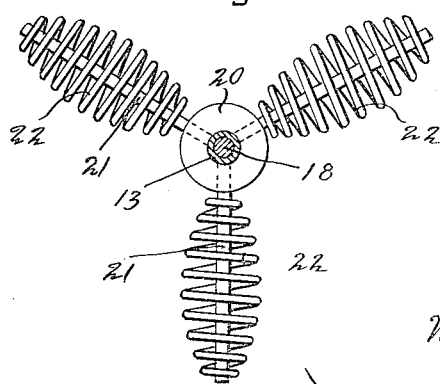
Witnesses
Inventor
W. D. Turner

UNITED STATES PATENT OFFICE.

WILLIAM DAVID TURNER, OF TUCSON, ARIZONA.

EGG-BEATER.

1,223,839.  Specification of Letters Patent.  Patented Apr. 24, 1917.

Application filed August 21, 1914. Serial No. 857,871.

*To all whom it may concern:*

Be it known that I, WILLIAM DAVID TURNER, a citizen of the United States, residing at Tucson, in the county of Pima, State of Arizona, have invented certain new and useful Improvements in Egg-Beaters; and I do hereby declare the following to be a full, clear, and exact description of the invention, such as will enable others skilled in the art to which it appertains to make and use the same.

This invention relates to culinary utensils and has particular reference to beating devices for eggs or other materials, having for its object the provision of a novel and efficient egg beater which will be very rapid and thorough in its operation and action.

An important object is the provision of an egg beater in which adjustment may be made to accommodate the use of receptacles of different depths in which the material to be beaten is contained.

Another object is the provision of a device of this character which will be simple and inexpensive in construction, efficient and durable in use and a general improvement of the art.

With these and other objects and advantages in view, the invention consists in the novel construction, and arrangement of parts to be hereinafter more fully described and claimed, and illustrated in the accompanying drawing, in which—

Figure 1 is a front elevation of my device,

Fig. 2 is a side elevation thereof,

Fig. 3 is a longitudinal sectional view, and

Fig. 4 is a cross sectional view.

Referring more particularly to the drawing, the numeral 5 designates the supporting frame of my device comprising upper and lower heads 6 and 7 connected by a bar 8 and provided at its extreme upper portion with a loop or handle 9. A trunnion 10 extends from the upper head 6 and has revoluble thereon a gear 11 provided with an operating handle 12.

A sleeve 13 is revoluble through the heads 6 and 7 and has secured thereon adjacent the lower head 7 a pinion 14 which is recessed as shown to coöperate with a recess in the top face of the lower head 7 to form a ball race containing a plurality of balls 15. The pinion 14 meshes with the gear 11. The upper end of the sleeve 13 is enlarged as shown at 16, the top face of the enlarged portion being recessed and coöperating with a similar recess in the second pinion 17 secured upon a shaft 18 extending through and beyond the sleeve 13. These recesses in the enlargement 16 and pinion 17 form a ball race for the reception of balls 19. The provision of ball bearings at the points of revolubility of the pinions 14 and 17 insures the easy running of the device.

It will be readily observed that when the gear 11 is rotated by means of the handle 12, the pinions 14 and 17 will be rotated in opposite directions, thereby rotating the sleeve 13 and shaft 18 in opposite directions.

In order that this motion may be utilized for beating eggs or any other material, I provide the shaft 18, at its lower end, with a head 20 from which radiates arms 21, preferably three in number, carrying wire coils 22. A similar head 23 is screwthreaded upon the sleeve 13 at its lower end and carries radial arms 24 provided with wire coils 25.

It will be seen that as the gear 11 is rotated, eggs or other materials to be beaten will be thoroughly and rapidly agitated by the coils 22 and 25.

It is to be noted that in view of the fact that the head 23 carrying the beater arms 24 is screw threaded upon the sleeve 13, in case the eggs or other material to be beaten are contained within a shallow vessel, the head 23 may be screwed toward the lower end of the sleeve. In case the eggs are contained within a deep vessel the head 23 may be screwed upon the sleeve 13 to be in its highest position. This is an important point as it is advantageous to have both sets of beaters or agitators operating within the material to be beaten.

From the foregoing description and a study of the drawing, it will be apparent that I have thus provided a simple and novel device whereby eggs or other materials may be expeditiously and properly beaten or mixed and which is adjustable for use in receptacles of different depths.

It will be readily understood that I reserve the right to make various changes in the form, construction and arrangement of parts without departing from the spirit of the invention or limiting the scope of the subjoined claims.

Having thus described my invention, I claim:

1. An egg beater comprising a sleeve, a shaft mounted thereon, a head secured to the lower end of the shaft and provided with radiating arms carrying the beaters, a second head threaded on the lower end of the said sleeve, radiating arms threaded into the second head also carrying beaters and adapted to impinge the surface of the sleeve to prevent accidental rotation of the head in relation to the sleeve and means for rotating the shaft and sleeve in opposite directions.

2. In an egg beater, a beater head, a shaft threaded through said beater head, and beater arms threaded into the head and adapted to bear against the shaft to lock the head from rotating on said shaft.

In testimony whereof, I affix my signature, in the presence of two witnesses.

WILLIAM DAVID TURNER.

Witnesses:
 JOHN MONROE SEIGLE,
 IRA TURNER.

Copies of this patent may be obtained for five cents each, by addressing the "Commissioner of Patents, Washington, D. C."